United States Patent [19]

Nakajima

[11] Patent Number: 4,820,922

[45] Date of Patent: Apr. 11, 1989

[54] RADIATION IMAGE RECORDING AND READ-OUT APPARATUS WITH SECTORED IMAGE RECORDING CAPABILITY

[75] Inventor: Nobuyoshi Nakajima, Kanagawa, Japan

[73] Assignee: Fuji Photo Film Co., Ltd., Kanagawa, Japan

[21] Appl. No.: 789,259

[22] Filed: Oct. 18, 1985

[30] Foreign Application Priority Data

Oct. 19, 1984 [JP] Japan ................. 59-220278

[51] Int. Cl.$^4$ ........................................... G01N 23/04
[52] U.S. Cl. .............................. 250/327.2; 250/484.1
[58] Field of Search .................... 250/327.2, 484.1; 378/181, 175, 176, 172

[56] References Cited

U.S. PATENT DOCUMENTS

| 3,381,128 | 4/1968 | Jimenez | 378/175 |
|---|---|---|---|
| 3,968,365 | 7/1976 | Sohngen | 378/181 |
| 4,392,239 | 7/1983 | Wilkens | 378/172 |
| 4,543,479 | 9/1985 | Kato | 250/327.2 |
| 4,580,774 | 4/1986 | Yamaguchi et al. | 271/176 |

Primary Examiner—Carolyn E. Fields

Attorney, Agent, or Firm—Sughrue, Mion, Zinn, Macpeak, and Seas

[57] ABSTRACT

Stimulable phosphor sheets are circulated through an image recording section for recording radiation images on the stimulable phosphor sheets, an image read-out section for scanning the stimulable phosphor sheets with stimulating rays and detecting light emitted thereby upon stimulation, and an erasing section for releasing radiation energy remaining on the stimulable phosphor sheets. The image recording section is provided with a shutter which is selectively moveable between a standby position in which it permits radiation to reach the whole area of the stimulable phosphor sheet and a shielding position in which it shields a part of the stimulable phosphor sheet from the radiation. The means for conveying the stimulable phosphor sheet through the image recording section is provided with a control means for causing the stimulable phosphor sheet to be conveyed by sectors when the shutter is in the shielding position, whereby sectored image recording in which two or more radiation images are recorded on respective sectors of a single stimulable phosphor sheet can be carried out.

6 Claims, 5 Drawing Sheets

RADIATION IMAGE RECORDING AND READ-OUT APPARATUS WITH SECTORED IMAGE RECORDING CAPABILITY

BACKGROUND OF THE INVENTION

1. Field of the Invention

This invention relates to a radiation image recording and read-out apparatus for exposing stimulable phosphor sheets to a radiation passing through an object to have a radiation image of the object stored thereon, exposing the stimulable phosphor sheets to stimulating rays which cause them to emit light in proportion to the stored radiation energy, and detecting and converting the emitted light into electric signals. This invention particularly relates to such an apparatus in which the stimulable phosphor sheets are circulated and reused for recording images and more particularly to such an apparatus in which the circulated and reused stimulable phosphor sheets can be conveyed by sectors and subjected to sectored image recording in the radiation image recording section.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor is first exposed to a radiation passing through an object to have a radiation image stored thereon, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, with regard to a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load such a mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

From the aforesaid viewpoint, the applicant proposed in U.S. patent application Ser. No. 037,119, which is a continuation of U.S. patent application Ser. No. 600,689 a radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path an provided with a stimulating ray source for emitting stimulating rays for scanning said stimulable phosphor sheet carrying said radiation image stored thereon in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, releasing the radiation energy remaining on said stimulable phosphor sheet, whereby said stimulable phosphor sheet is circulated through said image recording section, said image read-out section and said erasing section and reused for radiation image recording. The erasing section in this apparatus can be arranged to carry out an erasing method as disclosed, for example, in Japanese Unexamined Patent Publication No. 56(1981)-12599 or U.S. Pat. No. 4,470,619.

The radiation image recording and read-out apparatus of this construction meets the various aforesaid needs while also making it possible to carry out the radiation image recording and the reprocessing of the used stimulable phosphor sheets with very high efficiency.

In radiography, however, there are occasions when it is desirable to be able to view and compare two images of the same object recorded under different conditions or by different methods. For example, it is frequently desirable to be able to compare front and side images of the same human body or to compare images of the same object recorded before and after the injection of a contrast medium. At such times it is convenient if the two images can be recorded on opposite halves of one and the same stimulable phosphor sheet.

With the aforesaid radiation image recording and read-out apparatus it is possible to first record the two images to be compared on separate stimulable phosphor sheets and then to reproduce these images on a single photographic film, thus obtaining the same effect as when the two images are recorded on the same stimulable phosphor sheet. However from the point of reducing running costs by reducing the number of stimulable phosphor sheets required, and of shortening the processing time, it is preferable to be able to record the two images on opposite halves of the same stimulable phosphor sheet.

The advantage of reduced running costs obtainable by recording plural images on the same sheet can of course be enjoyed not only when image pairs are recorded for comparison but in any case where two or more images are recorded on a single sheet.

For recording two or even three or more images on different sectors of a single stimulable phosphor sheet (hereinafter referred to as sectored image recording) it is conceivable to use a method wherein the radiation field diaphragm is moved, a method wherein the radiation source is moved, or a method in which the sheet is moved and the size of the radiation field is reduced during sectored image recording without moving the radiation field diaphragm. Among these methods, the last mentioned is the best since it is the simplest to apply practically and does not require complex modifications in the structure of the radiation image recording and read-out apparatus.

SUMMARY OF THE INVENTION

One object of the present invention is to provide a radiation image recording and read-out apparatus which conducts radiation image recording and read-out by circulating the stimulable phosphor sheet.

Another object of the present invention is to provide a radiation image recording and read-out apparatus which is capable of carrying out sectored image recording.

The present invention provides a radiation image recording and read-out apparatus comprising a circulation and conveyance means for conveying stimulable phosphor sheets, an image recording section, an image read-out section, an erasing section, a shutter provided above said stimulable phosphor sheet in said image recording section and movable to a position for shielding a part of the stimulable phosphor sheet from radiation during sectored image recording, a shutter operating means for controlling the movement of said shutter, and a sectored image recording operation control means for, upon receipt of a sectored image recording command, moving the shutter to the shielding position and controlling said circulation and conveyance means so as to convey the stimulable phosphor sheet in said image recording section by sectors. The shutter is selectively moveable between the shielding position and a standby position in which it permits exposure of the whole stimulable phosphor sheet to radiation. It is made of a material having strong radiation shielding ability, e.g. lead, and is of a size large enough to cover at least half of the stimulable phosphor sheet.

During sectored image recording, when two images are to be recorded on a single stimulable phosphor sheet the sheet is conveyed by sectors each equal to one-half of its overall size. Likewise, when three or more images are to be recorded thereon, it is conveyed by sectors each equal to corresponding fractions of its overall size.

The operation of the shutter is matched to the sector-by-sector conveyance of the sheet in such manner that it is positioned to leave exposed only the sector of the sheet on which the image is to be recorded and to cover and shield from the radiation the remaining part thereof. For example, when the sheet is to be divided into three sectors each having a length in the direction of conveyance equal to one-third the overall length of the sheet, the shutter covers two-thirds thereof and leaves the remaining one-third uncovered. When sectored image recording is not being conducted and it is not necessary for the shutter to shield any part of the sheet from radiation, the shutter is retracted to the standby position to allow the entire area of the stimulable phosphor sheet to be exposed to the radiation.

Aside from being able to record two or more images on equal sized sheet sectors as described in the foregoing, the apparatus according to this invention is also capable of recording two or more images on sheet sectors of unequal size. For example, the sheet can be divided into one sector equal to one-third its overall size and another sector equal to the remaining two-thirds. In this case, the shutter first shields two-thirds of the sheet while an image is recorded on the other third thereof and then shields the exposed third while an image is recorded on the remaining two-thirds thereof, or vice versa.

In the foregoing description it is presumed that the field of the radiation covers the whole area of the stimulable phosphor sheet, and in such case it is necessary to provide a shutter at least as large as half the size of the sheet. If provision is made for stopping the radiation field down so that it covers less than the whole area of the sheet, however, it becomes possible to use a shutter that is smaller than half the size of the sheet. Namely, in such case the shutter need be only large enough to shield the part of each sector near its boundary with the neighboring sector during the recording of an image on the neighboring sector.

Where the shutter is constituted of a plurality of shutter blades, there is no need for the blades to be all made from the same material, and where a single shutter is used, it is permissible for it to be made up of a plurality of interlinked shutter elements insofar as adequate shielding property is maintained at the joints between the elements.

In accordance with this invention, since, in a system in which stimulable phosphor sheets are circulated and reused for recording and reading out radiation images, the sheets can be conveyed by sectors in the image recording section, it is possible, when desired, to carry out sectored image recording in which two or more images are recorded on each sheet. As a result, the efficiency of sheet utilization is enhanced and system running costs are reduced. Also, since two or more images can be recorded on a single sheet, pairs or groups of related images can be conveniently reproduced on a single photographic film or the like without need for carrying out any special operations in the read-out or reproduction steps.

DESCRIPTION OF THE PREFERRED EMBODIMENTS

The present invention will hereinbelow be described in further detail with reference to the accompanying drawings.

Figure 1:
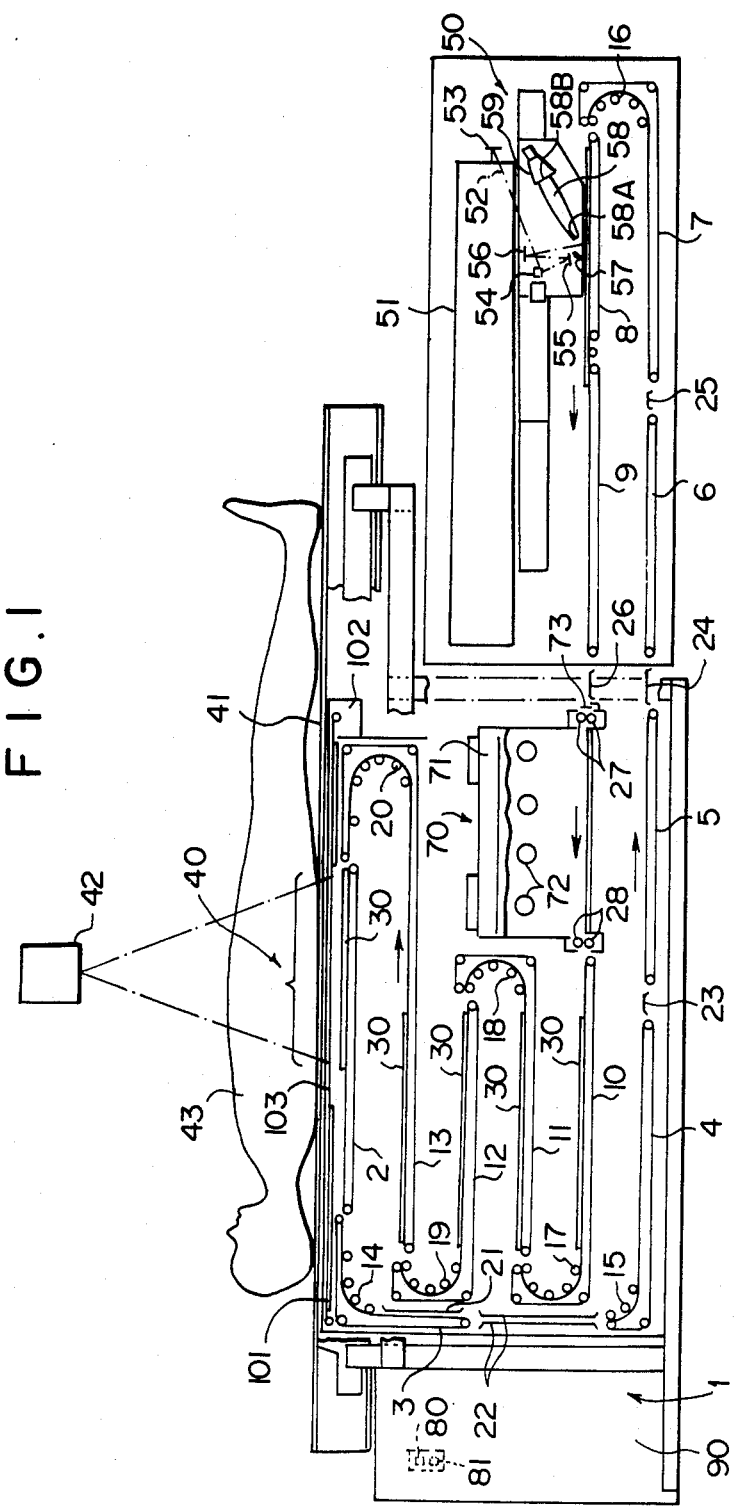
FIG. 1 is a schematic side view showing the basic structure of an embodiment of the radiation image recording and read-out apparatus according to this invention.

FIG. 1 schematically shows the basic structure of an radiation image recording and read-out apparatus in accordance with the present invention, wherein a radiation image of the chest, abdomen or the like of a lying object is recorded. The main unit 1 of the apparatus is provided with a sheet circulation and conveyance means constituting an endless circulation path and comprising endless belts 2, 3, 4, 5, 6, 7, 8, 9, 10, 11, 12 and 13, guide rollers 14, 15, 16, 17, 18, 19 and 20 rotated respectively by the endless belts 3, 4, 7, 10, 11, 12 and 13, guide plates 21, 22, 23, 24, 25 and 26, and nip rollers 27 and 28. In the sheet circulation and conveyance system, by way of example, six stimulable phosphor sheets 30 are conveyed and circulated in spaced relation to each other in the direction as indicated by the arrows.

An image recording table 41 is positioned above the uppermost endless belt 2 of the circulation and conveyance system and a radiation source 42, e.g. and X-ray source, is spaced from the image recording table 41 to stand face to face with the endless belt 2. An image recording section 40 is constituted by the image recording table 41 and the radiation source 42. A shutter 101 made of lead and having a size large enough to cover at least one-half the area of a sheet 30 is provided between the recording table 41 and the radiation source 42. The shutter 101 is driven by a drive motor 102 to move along a shutter guide 103 positioned parallel to the image recording table 41.

In ordinary radiation image recording, the sheet 30 on which the image is to be recorded is positioned on the endless belt 2 as shown in the drawing, and the radiation source 42 is activated with the object lying on the image recording table 41. In this manner, the sheet 30 is exposed to X-rays passing through the object 43 to have a radiation image of the object 43 stored on the sheet 30. At this time, the shutter 101 is in a standby position at which it does not overlap any part of the sheet 30 and allows the whole area of the sheet 30 to be exposed to the X-rays.

An image read-out section 50 is positioned at the right end of the sheet circulation and conveyance system. At the image read-out section 50, a laser beam source 51 is positioned above the endless belt 8 constituting a part of the image read-out section 50, and a mirror 53, a galvanometer mirror 54, and mirrors 55, 56 are positioned for scanning a laser beam 52 emitted by the laser beam source 51 in the width direction of the sheet 30 placed on the endless belt 8. The galvanometer mirror 54 is swung in both directions to scan the laser beam 52 in the main scanning direction on the sheet 30 carrying the radiation image stored thereon. The sheet 30 has been subjected to image recording at the image recording section 40 and then conveyed by the sheet circulation and conveyance system to the image read-out section 50. A light guiding reflection mirror 57 is positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly towards a light guide member 58 and the light emitted thereby and reflected by the light guiding reflection mirror 57 enters the light guide member 58 from a light input face 58A thereof, and is guided inside of the light guide member 58 through total reflection to a light output face 58B thereof. The light is thus detected by a photomultiplier 59 connected to the light output face 58B of the light guide member 58. Simultaneously with the scanning of the sheet 30 by the laser beam 52 in the main scanning direction, the sheet 30 is moved by the endless belt 8 in the subscanning direction as indicated by the arrow approximately normal to the main scanning direction, so that the whole surface of the sheet 30 is scanned by the laser beam 52. An electric image signal obtained by the photomultiplier 59 is sent to an image processing circuit (not shown) for processing the electric image signal. The image signal thus processed is then sent to an image reproducing apparatus (not shown). The image reproducing apparatus may be a display device such as a CRT, or a device for recording a visible image by point-by-point scanning on a photographic film. Or, the image may be stored on a storage means such as a magnetic tape.

In general, the time required for reading out a radiation image from one sheet 30 is longer than the time taken for recording the radiation image on the sheet 30. However, it is possible to quickly finish image recording on a plurality of sheets 30 and leave the exposed sheets 30 resting one each on the endless belts 7, 6, 5, 4 and 2 prior to read-out. Also, for example, Japanese Unexamined Patent Publication No. 58(1983)-89245 discloses a method wherein a read-out operation for detecting the image input information of a radiation image stored on a stimulable phosphor sheet (hereinafter referred to as the preliminary read-out) is conducted in advance by use of stimulating rays having stimulation energy of a level lower than that of the stimulation energy of stimulating rays used in a read-out operation for obtaining a visible image for viewing, particularly for diagnostic purposes (hereinafter referred to as the final read-out), and thereafter the final read-out gain is adjusted and/or appropriate signal processing is conducted to obtain a visible image having an improved image quality, particularly a high diagnostic efficiency and accuracy regardless of radiation exposure conditions. In the apparatus of the present invention, too, it is possible to conduct the preliminary read-out and the final read-out by returning the sheet 30, which has been sent onto the endless belt 9 after once being read out (the preliminary read-out), back to the image read-out position for a second read-out (the final read-out) by reversely rotating the endless belts 7, 8 and 9.

After image read-out is finished, the sheet 30 is conveyed by the endless belt 9 to an erasing section 70 comprising a case 71 and many erasing light sources 72, e.g. tungsten, sodium, xenon or iodine lamps, arranged within the case 71. After a shutter 73 is opened, the sheet 30 is conveyed by the endless belt 9 until the leading end of the sheet 30 contacts the nip rollers 27. The sheet 30 is thus sent into the case 71 by the rotating nip rollers 27. Then the shutter 73 is closed, and the erasing light sources 72 are turned on. The erasing light sources 72 mainly emit light having a wavelength within the stimulation wavelength range for the stimulable phosphor of the sheet 30. When the sheet 30 is exposed to the erasing light, the radiation energy remaining in the sheet 30 after the image read-out is released. At this time, since the shutter 73 is closed, no noise is generated in the read-out signal by erasing light leaking into the image read-out section 50.

After the radiation energy remaining on the sheet 30 is erased to such an extent that the next image recording on the sheet 30 is possible, the nip rollers 28 are rotated and the sheet 30 is conveyed out of the erasing section 70. Then, the sheet 30 is conveyed by the endless belts 10, 11, 12 and 13 onto the endless belt 2 at the image recording section 40. At this time, if a different sheet 30 is present on the endless belt 2 at the image recording section 40, the sheet 30 conveyed by the endless belts 10, 11 and 12 is kept waiting on the endless belt 13, and subsequent sheets 30 are kept waiting on the endless belts 12, 11 and 10. When the image recording and read-out operations are finished, the last sheet 30 is subjected to erasing at the erasing section 70, moved back onto the endless belt 9 by reverse rotation of the nip rollers 27, and kept waiting on the endless belt 9.

As described above, the endless belts 2 to 13 and nip rollers 27 and 28 of the sheet circulation and conveyance system are controlled in relation to the image recording section 40, the image read-out section 50 and the erasing section 70 by a known sequence control method or the like, thereby conveying or keeping the sheet waiting.

As mentioned earlier, there are times when it is desirable to be able to record two or more images of the same object 43 on different sectors of a single sheet 30. Such sectored image recording can be realized by an arrangement such as that shown in FIG. 2. More specifically, instructions for carrying out sectored image recording, for example instructions for the recording of two images on respective halves of a sheet 30, are entered via an external controller 90 which then transmits a corresponding command to the main unit 1 of the radiation image recording and read-out apparatus and through the main unit 1 also to the radiation source 42. As a result, the sheet 30 is conveyed by half lengths so that each of two sectors thereof can be separately exposed to the radiation from the radiation source 42. At this time, the drive motor 102 moves the shutter 101 along the shutter guide 103 prior to each exposure and stops it so as to cover the sector of the sheet 30 not being exposed while leaving the other sector uncovered.

Figure 2:
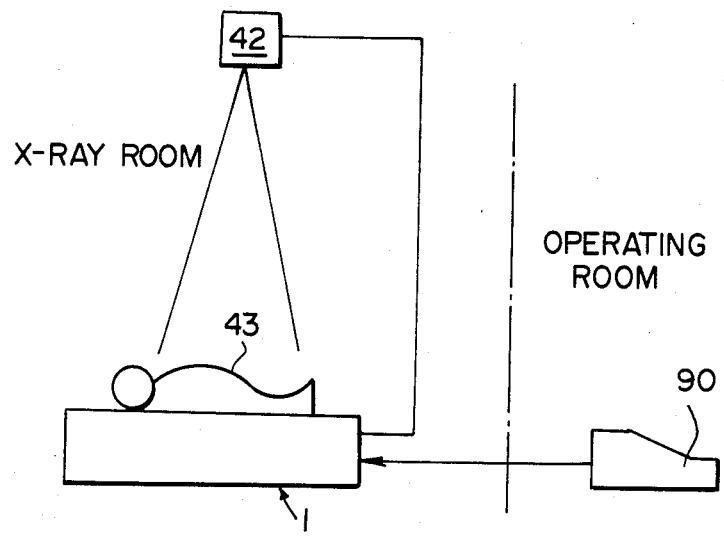
FIG. 2 is a schematic view showing an example of a recording mode designation system used at the time of sectored image recording according to the present invention.
Figure 3:
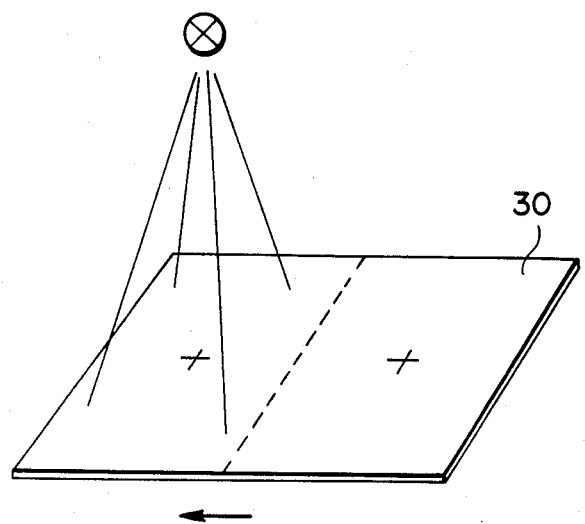
FIG. 3 is a perspective view schematically illustrating how two images are recorded on respective halves of a single stimulable phosphor sheet in accordance with the present invention.

The controller 90 can be provided in a separate operating room as shown in FIG. 2 or can be mounted on one end of the main unit 1 as shown in FIG. 1. In either case it is provided with a pair of buttons 80, 81 by which the operator can set the position of the shutter 101.

Namely, when the button 80 is pushed, the shutter 101 is moved along the shutter guide 103 from the standby position to the shielding position making it possible to conduct sectored image recording, and when the button 81 is pushed, the shutter 101 is moved from the shielding position back to the standby position making it possible to conduct ordinary image recording. The buttons 80, 81, the drive motor 102 and the shutter guide 103 together constitute the operating means for the shutter 101.

Control of the conveyance of the sheet 30 in sectored image recording will now be explained in detail with reference to FIGS. 4A, 4B and 5.

Figure 4A:
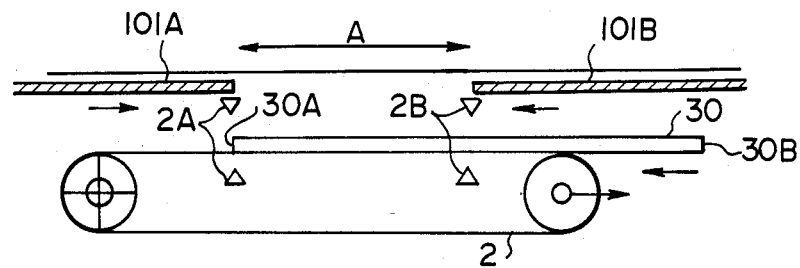
FIGS. 4A and 4B are side views showing an example of an arrangement for controlling sheet conveyance during sectored image recording in the embodiment shown in FIG. 1.
Figure 4B:
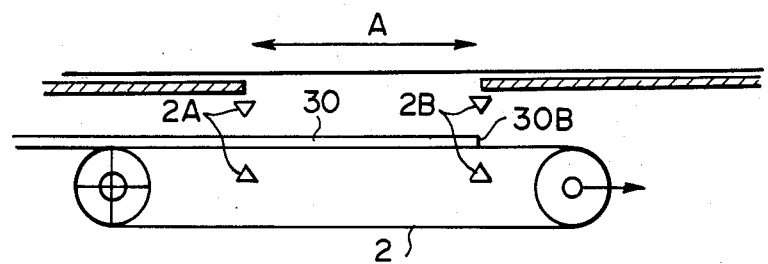
Figure 5:
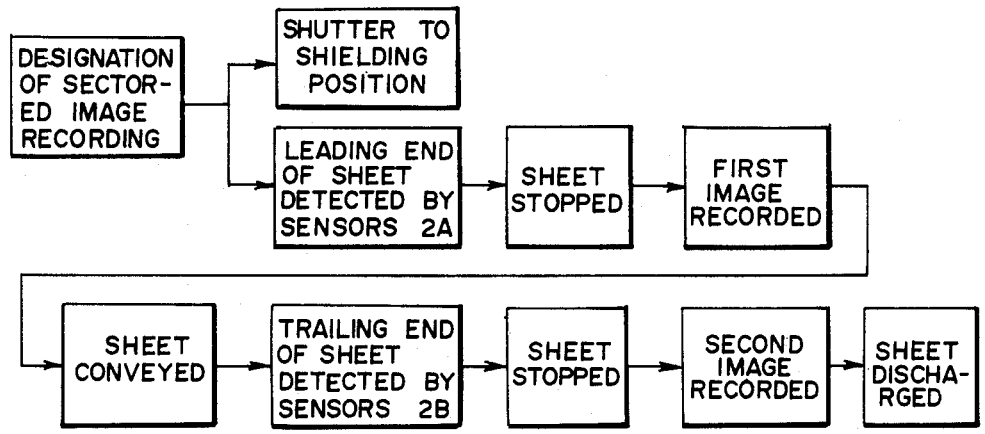
FIG. 5 is a block diagram showing the flow of control operations in the embodiment shown in FIG. 1, FIGS. 6A, 6B and 6C are side views showing an example of an arrangement for controlling sheet conveyance during sectored image recording in a second embodiment of the invention.

FIGS. 4A, 4B and 5 illustrate an example in which the positions at which the sheet 30 is stopped during its conveyance by the endless belt 2 are controlled using two sensor pairs 2A and 2B. In this example the shutter 101 consists of two shutter blades 101A, 101B and when the sectored image recording mode of operation is designated through the controller 90, the shutter blades 101A, 101B move to positions at which they shield one half of the sheet 30 and define an image recording sector A therebetween. At the same time, the sheet 30 fed onto the endless belt 2 is advanced until its leading end 30A is detected by the sensors 2A positioned at the forward end of the image recording sector A and is stopped in this position (FIG. 4A). The radiation source 42 is then activated to record an image on the forward (first) sector of the sheet 30. Next, the endless belt 2 is driven and the sheet 30 is advanced until its trailing end 30B is detected by the sensors 2B positioned at the rearward end of the image recording sector A and is stopped at this position (FIG. 4B). The radiation source 42 is then activated to record an image on the rearward sector of the sheet 30. After recording of the image on the rearward (second) sector has been completed, the sheet 30 is discharged from the image recording section 40 and is conveyed to the next processing step.

An example in which the two sensor pairs 2A, 2B are replaced by a single sensor pair 2C will now be explained with reference to FIGS. 6A–6D and FIG. 7.

Figure 6A:
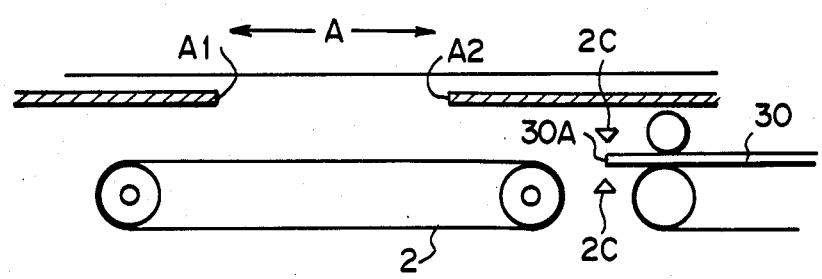
Figure 6B:
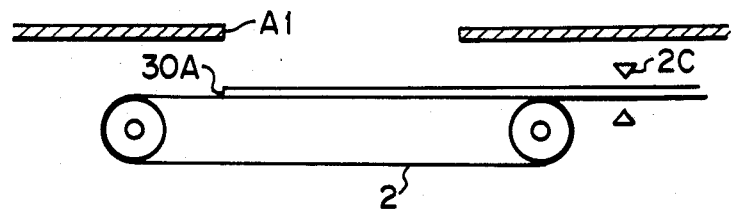
Figure 6C:
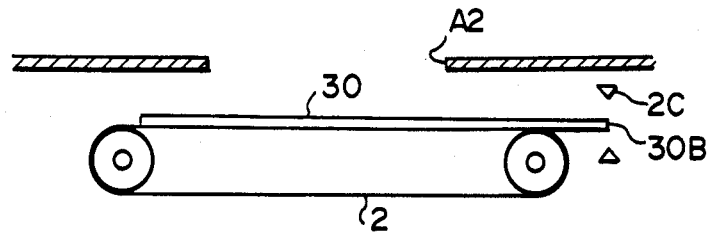
Figure 6D:
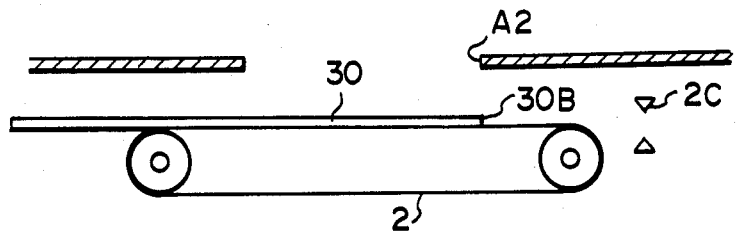
Figure 7:
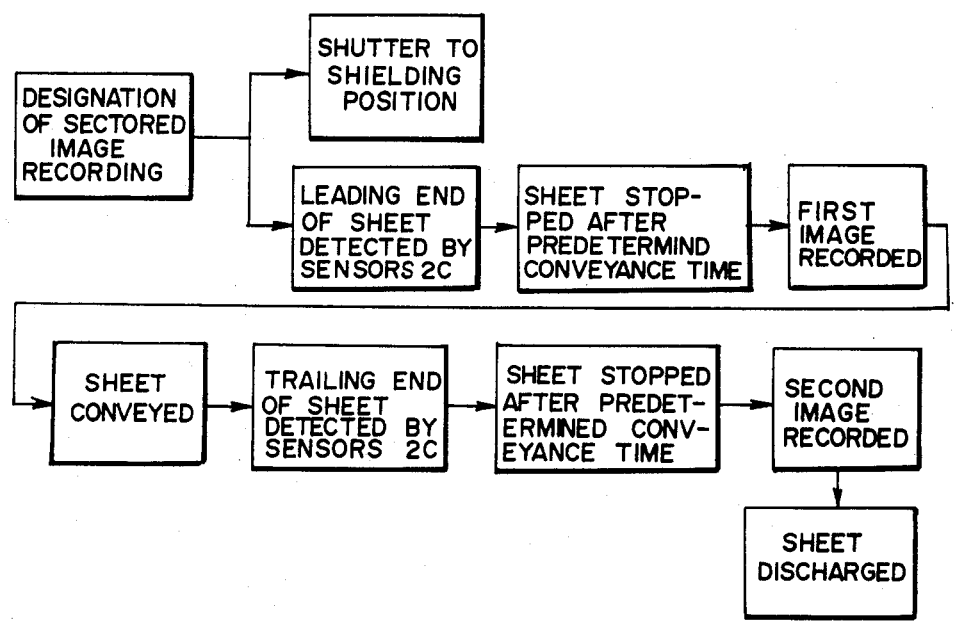
FIG. 7 is a block diagram showing the flow of control operations in the second embodiment of the invention.

In this example, the sensors 2C are positioned ahead of the image recording sector A and the endless belt 2 is stopped after the lapse of a first prescribe time period from the time that the leading end 30A of the sheet 30 is detected by the sensors 2C at the position shown in FIG. 6A. As the first prescribed time period is the same as the time required for the leading end 30A of the sheet 30 to move from the position of the sensors 2C to the forward end A1 of the image recording sector A, the sheet 30 is properly located for recording of an image on its forward (first) sector after the lapse of this time (FIG. 6B). After recording of the image on the first sector is completed, the endless belt is again driven and kept in operation until a second prescribed time has lapsed from the time that the trailing end 30B of the sheet 30 is detected by the sensors 2C at the position shown in FIG. 6C. As the second prescribed time period is the same as the time required for the trailing end 30B of the sheet 30 to move from the position of the sensors 2C to the rearward end B1 of the second image recording sector A, the sheet 30 is properly located for recording of an image on its rearward (second) sector after the lapse of this time (FIG. 6D). After recording of the image on the second sector is completed, the sheet 30 is conveyed to the next processing step.

While the two examples described in the foregoing both relate to sectored image recording in which the sheet 30 is divided into two sectors, recording in which the sheet 30 is divided into three or more sectors can also be carried out in a similar manner.

I claim:

1. A radiation image recording and read-out apparatus comprising:
   (i) a circulating and conveying means for conveying at least one stimulable phosphor sheet for recording a radiation image thereon along a predetermined endless circulation path,
   (ii) an image recording section positioned on said circulation path for recording a radiation image of an object on said stimulable phosphor sheet by exposing said stimulable phosphor sheet to a radiation passing through said object,
   (iii) an image read-out section positioned on said circulation path and provided with a stimulating ray source for emitting stimulating rays for scanning said stimulable phosphor sheet carrying said radiation image stored thereon at said image recording section, and a photoelectric read-out means for detecting light emitted by said stimulable phosphor sheet scanned by said stimulating rays to obtain an electric image signal,
   (iv) an erasing section for, prior to the next image recording on said stimulable phosphor sheet for which the image read-out has been conducted at said image read-out section, releasing the radiation energy remaining on said stimulable phosphor sheet,
   (v) a shutter provided above said stimulable phosphor sheet in said image recording section and movable between a shielding position in which it shields a part of said stimulable phosphor sheet from said radiation and a standby position in which it permits exposure of the whole stimulable phosphor sheet to said radiation,
   (vi) a shutter operating means which moves said shutter between said shielding position and said standby position in accordance with instructions received from the exterior,
   (vii) a sectored image recording operation control means for, upon receipt of a sectored image recording command, moving the shutter to the shielding position and controlling said circulation and conveyance means so as to convey the stimulable phosphor sheet in said image recording section by sectors, and
   (viii) wherein said circulating and conveying means comprises means at each section for independently conveying said at least one stimulable phosphor sheet such that the movement of the stimulable phosphor sheet at the image recording section is independent of the movement of those other sections wherein, during sectored image recording on said sheet at the image recording section, images may be read out continuously from other sheets at the read-out section even during interruption of recording between respective sectors of said stimulable phosphor sheet at said image recording section.

2. An apparatus as defined in claim 1 wherein said shutter consists of a plurality of shutter blades.

3. An apparatus as defined in claim 2 wherein said shutter consists of two shutter blades which define an image recording sector therebetween when the shutter is in the shielding position.

4. An apparatus as defined in claim 1 wherein said shutter operating means comprises a motor and a shutter guide.

5. An apparatus as defined in claim 3 wherein said sectored image recording operation control means comprises a first pair of sensors positioned at the forward end of said image recording sector for detecting the leading end of said stimulable phosphor sheet and a second pair of sensors positioned at the rearward end of said image recording sector for detecting the trailing end of said stimulable phosphor sheet and conveyance of said stimulable phosphor sheet is stopped for recording of an image on a first sector thereof when said first pair of sensors detects the leading end thereof and is stopped for recording an image on a second sector thereof when said second pair of sensors detects the trailing end thereof.

6. An apparatus as defined in claim 3 wherein said sectored image recording operation control means comprises a single pair of sensors positioned ahead of said image recording sector and said stimulable phosphor sheet is stopped for recording of an image on a first sector thereof after the lapse of a first predetermined time period from the time that the leading end thereof is detected by the pair of sensors and is stopped for recording of an image on a second sector thereof after the lapse of a second predetermined time period from the time that the trailing end thereof is detected by the pair of sensors.

* * * * *